United States Patent
Trinkert et al.

(10) Patent No.: US 10,424,944 B2
(45) Date of Patent: Sep. 24, 2019

(54) DYNAMIC REGULATION OF AN ELECTRIC OUTPUT

(71) Applicant: Robert Bosch GmbH, Stuttgart (DE)

(72) Inventors: Stefan Trinkert, Gaeufelden (DE); Benjamin Mangold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 15/304,561

(22) PCT Filed: Mar. 23, 2015

(86) PCT No.: PCT/EP2015/056048
§ 371 (c)(1),
(2) Date: Oct. 17, 2016

(87) PCT Pub. No.: WO2015/158498
PCT Pub. Date: Oct. 22, 2015

(65) Prior Publication Data
US 2017/0040807 A1 Feb. 9, 2017

(30) Foreign Application Priority Data
Apr. 17, 2014 (DE) .................. 10 2014 207 385

(51) Int. Cl.
*H02J 7/00* (2006.01)
*B60L 58/22* (2019.01)

(52) U.S. Cl.
CPC ............ *H02J 7/0014* (2013.01); *B60L 58/22* (2019.02); *H02J 7/0021* (2013.01);
(Continued)

(58) Field of Classification Search
USPC ....... 320/134, 104, 132, 118, 116, 106, 109, 320/112, 126, 107, 128, 162
See application file for complete search history.

(56) References Cited

U.S. PATENT DOCUMENTS 5,578,915 A * 11/1996 Crouch, Jr. ........... H02J 7/0021
320/118
8,972,091 B2 * 3/2015 Li ....................... B60L 11/1861
701/22
(Continued)

FOREIGN PATENT DOCUMENTS

EP          1814206          8/2007

OTHER PUBLICATIONS

International Search Report for Application No. PCT/EP2015/056048 dated May 28, 2015 (English Translation, 2 pages).

*Primary Examiner* — Alexis B Pacheco
(74) *Attorney, Agent, or Firm* — Michael Best & Friedrich LLP

(57) ABSTRACT

The invention relates to a method for automatically regulating an electric output which is dispensed by a secondary battery that has at least two battery cells, wherein
the charge states of all the battery cells are repeatedly detected at time intervals,
an average charge state ($SOC_{average}$) is ascertained per battery cell from the detected charge states of the battery cells,
a deviation of at least one charge state of a battery cell from the average charge state ($SOC_{average}$) is detected, and
the average charge state ($SOC_{average}$) and the deviation are taken into consideration during the automatic and dynamic regulation of the electric output dispensed by the secondary battery.

8 Claims, 1 Drawing Sheet

(52) U.S. Cl.
CPC ........ *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 2004/0164706 A1* | 8/2004 | Osborne | H02J 7/0018 320/116 |
| 2006/0071643 A1* | 4/2006 | Carrier | H01M 10/4257 320/132 |
| 2006/0091858 A1* | 5/2006 | Johnson | B25F 5/00 320/128 |
| 2008/0090133 A1 | 4/2008 | Lim et al. | |
| 2008/0239628 A1* | 10/2008 | Tatebayashi | H02J 7/0026 361/434 |
| 2011/0316520 A1 | 12/2011 | Kawahara et al. | |
| 2012/0105001 A1* | 5/2012 | Gallegos | B60L 3/0046 320/109 |
| 2012/0274281 A1* | 11/2012 | Kim | G01R 31/3679 320/112 |
| 2013/0106357 A1 | 5/2013 | Girard et al. | |
| 2013/0169234 A1* | 7/2013 | Chuah | H01M 10/44 320/136 |
| 2013/0187466 A1 | 7/2013 | Sakai et al. | |
| 2014/0091751 A1* | 4/2014 | Workman | H02J 7/0013 320/106 |
| 2014/0361743 A1* | 12/2014 | Lin | B60L 11/1861 320/109 |

* cited by examiner

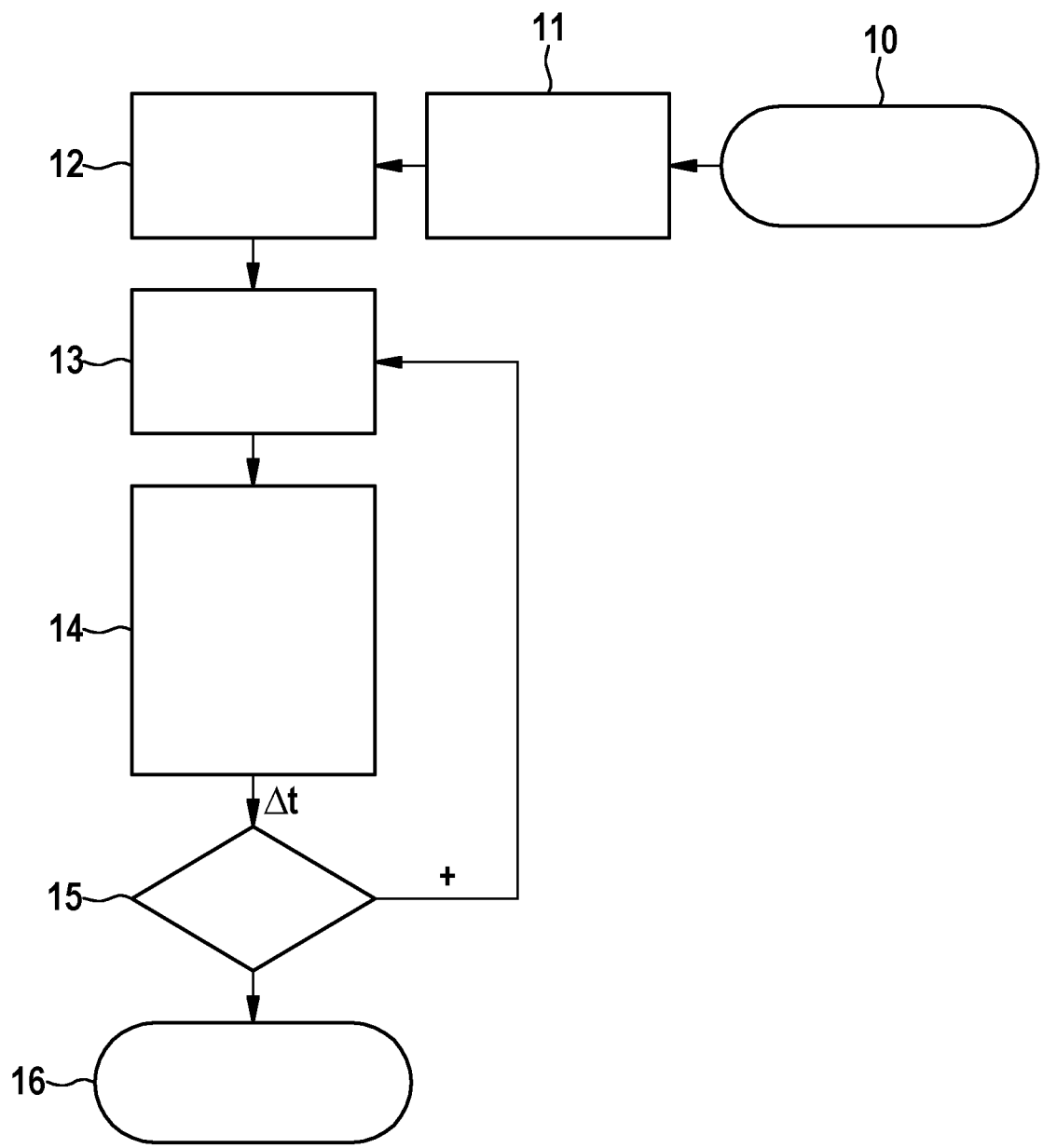

DYNAMIC REGULATION OF AN ELECTRIC OUTPUT

BACKGROUND OF THE INVENTION

Secondary batteries, which typically have a large number of battery cells connected in series and/or in parallel, in hybrid and electric vehicles. Electric drive devices of hybrid and electric vehicles are supplied with electrical energy by the secondary batteries. The battery cells can, for example, be based on a lithium-ion technology or on a nickel-metal hydride technology.

In order to be able to optimize the service life of battery cells and consequently of a secondary battery, it is necessary to know at any time the momentary operating state of the battery cells or respectively the secondary battery. A battery management system (BMS) is typically used for testing and regulating a secondary battery, said BMS ensuring a service life of the secondary battery and the battery cells thereof to be as long as possible besides monitoring the safety of said battery.

Besides comprising sensors, which can detect the electrical cell voltage generated by each individual battery cell, the total battery current and a battery temperature, a battery management system comprises a safety function which prevents a maximum admissible electric cell voltage from being exceeded in order to avoid damage to the battery cell or respectively to the secondary battery.

A possible deep discharge of the battery cells can also be counteracted by means of a battery management system. This is advantageous because a discharge of a battery cell below a certain charging threshold can promote adverse chemical processes in a battery cell, which can lead to an irreversible degradation of the battery cells. In order to counteract the aforementioned deep discharge of battery cells, fixed safety limits for the state of charge (SOC) of the battery cells of a secondary battery are predefined, which, however, can be exceeded or undershot by individual battery cells due to various conditions, such as, for example, the irregular ageing behavior of individual battery cells and different capacitive properties and energy densities of individual battery cells, during regular activation of a secondary battery.

According to the current prior art, variants of the so-called "cell balancing" for compensating cell voltage differences do in fact exist; however, even the most effective method of the so-called "autonomous cell balancing" is only initiated after an extended non-operative state of a vehicle equipped with a secondary battery. A "cell balancing" does not take place during the operation of a vehicle.

The European Patent Office patent EP 1 814 206 A1 relates to a device for balancing a multiplicity of at least two battery cells of a multiple cell battery, comprising a multiple cell battery and a battery management system with a balancing circuit. The individual battery cells are connected to a battery monitoring system, wherein the battery management system measures each individual electrical cell voltage, the battery temperature and the electrical current. The battery monitoring system can detect the lowest electrical cell voltage. In addition, the battery monitoring system can detect a number of cells, the electrical cell voltage of which is higher than a certain maximum admissible electrical voltage, wherein these cells are balanced until the electrical voltages of these cells have decreased to an acceptable lower value. The battery management system is active when the battery is being charged or discharged, wherein the threshold values vary with the state of the battery.

SUMMARY OF THE INVENTION

The subject matter of the invention is a method for automatically regulating an electric output which is dispensed by a secondary battery that has at least two battery cells, wherein
- charge states of all the battery cells are repeatedly detected at predefinable time intervals,
- an average charge state is ascertained per battery cell from the detected charge states of the battery cells,
- a deviation of at least one charge state of a battery cell from the average charge state is detected, and
- the average charge state and the deviation are taken into consideration during the automatic and dynamic regulation of the electric output dispensed by the secondary battery.

According to the invention, the charge states of all the battery cells are repeatedly detected at predefinable time intervals and thus can be taken into consideration during the automatic and dynamic regulation of the electric output dispensed by the secondary battery. The charge states of the battery cells are preferably repeatedly detected independently of an operating state of a vehicle equipped with a corresponding secondary battery. The charge states of the battery cells can be ascertained by means of cell monitoring circuits (so-called "cell supervision circuits"; CSCs), which are in each case associated with an individual battery cell or a module composed of battery cells and with which the electrical cell voltages of the individual battery cells can be detected. The respective state of charge of the individual battery cells can be inferred from the electrical cell voltages of the battery cells.

The average charge state per battery cell $SOC_{average}$ is ascertained using the correspondingly ascertained charge states of the individual battery cells. Due to repeatedly detecting the charge states of all the battery cells at predefinable time intervals, said average charge state can then be dynamically adapted to the respective operation of a secondary battery in order to be able to be taken into consideration for an automatic and dynamic regulation of the electric output dispensed by the secondary battery. The deviations of charge states of individual battery cells from the average charge state per battery cell, which change during the operation of a secondary battery, are also automatically and dynamically detected by repeatedly detecting the charge states of all the battery cells at predefinable time intervals. The aforementioned deviations can then be taken into consideration for the automatic and dynamic regulation of the electric output dispensed by the secondary battery.

With the aid of the inventive automatic and dynamic regulation of the electric output dispensed by the secondary battery, a residual capacity of a secondary battery can almost completely be used, which significantly increases the efficiency of the secondary battery. Furthermore, the method according to the invention represents a preventative measure which protects the hardware components of a secondary battery and thus makes a longer service life of the battery possible, in particular because power pulsations can be prevented by the safety function associated with said method. This implies a more protective treatment of the battery cells as well as the entire electronics of a secondary battery, which significantly increases the service life of all the battery components and thus reduces future costs.

The time intervals in which the charge states of all the battery cells are repeatedly detected can lie in the range of 50 ms to 150 ms. The time intervals are preferably 100 ms.

According to one advantageous embodiment, a difference is ascertained between a charge state of a battery cell having the highest charge and a charge state of a battery cell having the lowest charge and is taken into consideration during the automatic and dynamic regulation of the electric output dispensed by the secondary battery. The electric output dispensed by a secondary battery can subsequently be automatically and dynamically controlled as a function of the difference between the charge state of the battery cell having the highest charge and the charge state of the battery cell having the lowest charge. The charge state of the battery cell having the highest charge and the charge state of the battery cell having the lowest charge can be stored for the further use thereof. The electric output dispensed by the secondary battery can, for example, be adjusted downwards as a function of the ascertained difference. Particularly for large values of the average charge state per battery cell $SOC_{average}$, the dispensed electric output can be more strictly limited in the case of a relatively large difference, particularly in order to prevent battery cells, which have a very large deviation of the charge state thereof from the average charge state per battery cell in an upward direction, from entering into an overvoltage range which can damage the relevant battery cells. After the charge states of all the battery cells have repeatedly been detected, it can be detected whether the charge state $SOC_{max}$ of a battery cell having the highest charge and/or the charge state $SOC_{min}$ of a battery cell having the lowest charge has changed across all the battery cells. Should this condition be met for one of these two charge state values, the ascertained difference changes between the charge state of the battery cell having the highest charge and the charge state of the battery cell having the lowest charge so that a previously enabled electric output can be optimally adjusted in accordance with the newly ascertained charge states. Should, on the other hand, the values for $SOC_{max}$ or $SOC_{min}$ be unchanged after the time interval, the secondary battery can be operated as before with the previously calculated specifications.

According to a further advantageous embodiment, the average charge state is multiplied by a function which depends on the ascertained difference ($\Delta$), wherein a function value of the function for the respectively ascertained difference is ascertained from a predefined relationship between the possible values of the ascertained difference and the possible function values. The function can be implemented using software technology and, for example, be provided in the form of a multiplier function for the relevant value range. The function can draw the respective function value $x=f(\Delta(SOC_{max}; SOC_{min})$ from the predefined relationship between the possible values of the ascertained difference and the possible function values.

A further advantageous embodiment provides for the predefined relationship to be defined by at least one characteristic curve. According to this provision, the function can draw the respective function value thereof from the characteristic curve or from a family of characteristic curves which represent a predefined fixed relationship between the possible values of the ascertained difference and the possible function values.

According to a further advantageous embodiment, the predefined relationship is defined by means of at least on PI controller. A fixed predefined relationship between the possible values of the ascertained difference and the possible function values of the function can also be established by means of the PI controller.

The subject matter of the invention is furthermore a system, in particular for an electrically powered motor vehicle, for automatically and dynamically regulating an electric output which is dispensed by a secondary battery that has at least two battery cells, comprising at least one electronic device which is equipped to:
- repeatedly detect the charge states of all the battery cells at time intervals.
- to ascertain an average charge state per battery cell from the detected charge states of the battery cells,
- to detect a deviation of at least one charge state of a battery cell from the average charge state, and
- to take the average charge state and the deviation into consideration during the automatic and dynamic regulation of the electric output dispensed by the secondary battery.

The system can be designed as a battery management system (BMS). The advantages stated above with respect to the method are correspondingly associated with the system. The system can have a cell supervision circuit (CSC) per battery cell in order to detect the electrical cell voltages of the individual battery cells and to be able to ascertain the charge states of the battery therefrom.

The electric output dispensed by the secondary battery can be derived from a propulsion torque specified by a driver of a vehicle.

According to one advantageous embodiment, the electronic device is equipped to ascertain a difference between a charge state of a battery cell having the highest charge and a charge state of a battery cell having the lowest charge and to take this difference into consideration during the automatic and dynamic regulation of the electric output dispensed by the secondary battery. The advantages stated above with respect to the corresponding embodiment of the method are also correspondingly associated with this embodiment.

According to a further advantageous embodiment, the electronic device is equipped to multiply the average charge state by a function that depends on the ascertained difference and to ascertain a function value of the function for the respectively ascertained difference from a predefined relationship between the possible values of the ascertained difference and the possible function values. The advantages stated above with respect to the corresponding embodiment of the method are also correspondingly associated with this embodiment.

Provision is made in a further advantageous embodiment for the predefined relationship to be defined by at least one characteristic curve deposited in the electronic device or in a separate storage device. The advantages stated above with respect to the corresponding embodiment of the method are also correspondingly associated with this embodiment.

It is furthermore considered to be advantageous if the electronic device has at least one PI controller, by means of which the predefined relationship is defined. The advantages stated above with respect to the corresponding embodiment of the method are also correspondingly associated with this embodiment.

BRIEF DESCRIPTION OF THE DRAWINGS

The invention is explained below in an exemplary manner with reference to the attached figure using a preferred exemplary embodiment, wherein the features subsequently described can constitute an aspect of the invention when taken respectively by themselves as well as in different combinations with one another. In the drawing:

FIG. 1: shows an exemplary embodiment of a method according to the invention.

DETAILED DESCRIPTION

FIG. 1 shows an exemplary embodiment of a method according to the invention. In step 10, an electric output by means of an electric machine is accessed by a secondary battery. In step 11, an electronic device of the system according to the invention ascertains the charge states of all the battery cells and ascertains therefrom a charge state $SOC_{max}$ of a battery cell having the highest charge and a charge state $SOC_{min}$ of a battery cell having the lowest charge. In step 12, the electronic device ascertains an average charge state $SOC_{average}$ per battery cell from the ascertained charge states of the individual battery cells. In step 13, the electronic device of the system ascertains a difference between the charge state $SOC_{max}$ and the charge state $SOC_{min}$. In step 14, the electronic device of the system limits the electric output dispensed by the secondary battery as a function of the difference ascertained in step 13. This can, for example, take place using a characteristic curve or a family of characteristic curves in combination with a multiplier function. After a predefinable time interval Δt, a check is made with the electronic device of the system in step 15 whether the charge state $SOC_{max}$ and/or the charge state $SOC_{min}$ has changed. If this is the case, the electronic device of the system goes to step 13 in order to be able to adjust and regulate the electric output dispensed by the secondary battery to the new conditions. If the charge state $SOC_{max}$ and/or the charge state $SOC_{min}$ have/has not changed, which was checked in step 15, the secondary battery can continue to be operated in step 16 with the previously ascertained specifications.

The invention claimed is:

1. A method for automatically regulating an electric output which is dispensed by a secondary battery that has at least two battery cells, the method comprising:
   repeatedly detecting charge states of all the battery cells at time intervals,
   ascertaining an average charge state ($SOC_{average}$) per battery cell from the detected charge states of the battery cells,
   ascertaining a difference between a charge state ($SOC_{max}$) of a battery cell of the at least two battery cells having the highest charge and a charge state ($SOC_{min}$) of a battery cell of the at least two battery cells having the lowest charge, and
   automatically and dynamically regulating the electric output of the secondary battery based on the average charge state ($SOC_{average}$) and the difference.

2. The method according to claim 1, wherein the average charge state ($SOC_{average}$) is multiplied by a function which depends on the difference, wherein a function value of the function for the difference is ascertained from a predefined relationship between the possible values of the difference and the possible function values.

3. The method according to claim 2, wherein the predefined relationship is defined by at least one characteristic curve.

4. The method according to claim 2, wherein the predefined relationship is defined by means of at least one proportional integral (PI) controller.

5. A system for automatically and dynamically regulating an electric output which is dispensed by a secondary battery that has at least two battery cells, comprising at least one electronic device that is configured to:
   repeatedly detect charge states of all the battery cells at time intervals,
   ascertain an average charge state ($SOC_{average}$) per battery cell from the detected charge states,
   ascertain a difference between a charge state ($SOC_{max}$) of a battery cell of the at least two battery cells having the highest charge and a charge state ($SOC_{min}$) of a battery cell of the at least two battery cells having the lowest charge, and
   automatically and dynamically regulate the electric output dispensed by the secondary battery based upon the average charge state ($SOC_{average}$) and the difference.

6. The system according to claim 5, wherein the electronic device is configured to multiply the average charge state ($SOC_{average}$) by a function which depends on the ascertained difference and to ascertain a function value of the function for the difference from a predefined relationship between the possible values of the difference and the possible function values.

7. The system according to claim 6, wherein the predefined relationship is defined by at least one characteristic curve deposited in the electronic device or in a separate storage device.

8. The system according to claim 6, wherein the electronic device has at least one proportional integral (PI) controller, by means of which the predefined relationship is defined.

* * * * *